United States Patent [19]

Pfeiffer

[11] Patent Number: 4,930,038
[45] Date of Patent: May 29, 1990

[54] CURRENT OVERLOAD TRIPPING DEVICE WITH LEADING TRIPPING ACTION

[75] Inventor: Bernhard Pfeiffer, Berlin, Fed. Rep. of Germany

[73] Assignee: Siemens Aktiengesellschaft, Berlin & Munich, Fed. Rep. of Germany

[21] Appl. No.: 212,589

[22] Filed: Jun. 28, 1988

[30] Foreign Application Priority Data

Jun. 29, 1987 [DE] Fed. Rep. of Germany ....... 3721848

[51] Int. Cl.⁵ .......................................... G11B 15/68
[52] U.S. Cl. ........................................ 361/92; 361/96
[58] Field of Search ................................... 361/92–99

[56] References Cited

U.S. PATENT DOCUMENTS 4,644,438 2/1987 Puccinelli ............................... 361/96
4,780,786 10/1988 Weynatcher ........................... 361/96

FOREIGN PATENT DOCUMENTS 0153535 9/1985 European Pat. Off. .
674539 4/1939 Fed. Rep. of Germany .
1588836 10/1970 Fed. Rep. of Germany .
1223313 6/1960 France .
234153 5/1925 United Kingdom .
380580 9/1932 United Kingdom .
391225 4/1933 United Kingdom .

Primary Examiner—Leo P. Picard
Assistant Examiner—Donovan
Attorney, Agent, or Firm—Kenyon & Kenyon

[57] ABSTRACT

A current overload tripping device having a time-delayed leading tripping action during uneven loading of the phases of a multiphase circuit. The tripping device includes a current pickup for each phase wherein the current pickup members are connected in series with one another and with an electromagnetic converter. Each of the current pickup members comprises a winding surrounding a magnet yoke of an electromagnetic tripping device of each phase and the electromagnetic converter comprises a temperature/time-dependent device operating to provide a time-delayed tripping signal.

3 Claims, 1 Drawing Sheet

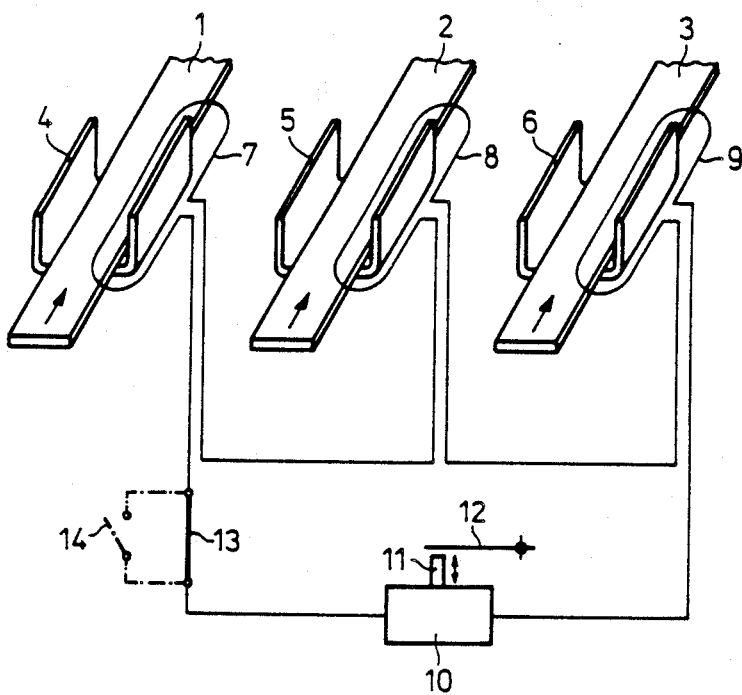

CURRENT OVERLOAD TRIPPING DEVICE WITH LEADING TRIPPING ACTION

BACKGROUND OF THE INVENTION

The invention relates to a current overload tripping device operating to provide a time-delayed leading tripping action when there is an uneven loading of the phases of a multiphase circuit. Such a device is especially useful for motor protection. Generally, a transformer current pickup member is assigned to each phase of the multiphase circuit with the current pickup members being connected in series with each other and with an electromechanical converter. A current overload tripping device of this type is described in DE-C-674 539. The leading tripping action is caused by the fact that an uneven loading of the phases causes a difference current which is fed to a tripping member. If the phases are loaded evenly, however, no difference current occurs. A summing current transformer is used to determine the phase currents. The core of the summing current transformer includes several windings through which the phase currents flow, as well as series-connected secondary windings. Such an arrangement requires a relatively large amount of space for implementation.

In this connection, it is an object of the present invention to simplify the design of a current overload tripping device having a leading tripping action and to thereby permit the use of the leading characteristic in relatively small switch gear structures having a relatively limited amount of space available for installing such tripping devices.

According to the invention, the space problem is obviated by the provision that a winding surrounding the magnets yoke of an electromagnetic tripping device of each phase serves as the current pickup member, and a temperature/time-dependent arrangement for delivering a time-delayed tripping signal serves as the electromechanical converter. Accordingly, a separate summing current transformer is not required. The windings about the magnet yokes can be accommodated practically without any additional space requirements in the switch gear structure since they each require only one or a few turns. By evaluating the difference current in a temperature/time-dependent device, an asymmetry does not necessarily cause an immediate tripping action and, thereby, an interruption of operation. Only the presence of an asymmetry over a certain time interval leads to tripping. For instance, the electromechanical converter can include, for this purpose, a break contact for the exciter winding of the magnetic drive of a contactor. A break contact, for instance, would be suited for actuating the auxiliary tripping device of a protective switch. For normal overload protection, ordinary thermal tripping devices or relays can be used which operate without lead and are, therefore, of simple design. If required, a current overload tripping device according to the invention can be added which requires no mechanical connection of any kind with the thermal tripping device and need not even be arranged in its proximity. This results in a clearcut design which utilizes the available space of compact switch gear structures in an efficient and economical manner.

Moreover, only a very small amount of auxiliary energy is required to cause a tripping signal. Therefore, the current pickup members do not have to meet stringent requirements Pursuant to one embodiment of the present invention, the temperature/time-dependent arrangement can comprise, for example, a bimetallic element such as is also used for normal current overload tripping devices. Pursuant to another embodiment of the invention, the temperature/time-dependent arrangement can comprise heatable elements made from a shape-memory alloy. Bimetallic elements as elements of a shape-memory alloy can be provided in a directly or indirectly heated arrangement.

A switch can be inserted into the series circuit of the current pickup members and the electromechanical converter. This switch permits an optional operation, as a function of switch position, of a switch gear with or without a leading tripping action.

The invention will be described in greater detail in the following detailed description making reference to the exemplary embodiment illustrated in the figure.

BRIEF DESCRIPTION OF THE DRAWING

The FIGURE is a schematic illustration of the current overload tripping device of the invention.

DETAILED DESCRIPTION

Referring now to the figure, the phase conductors of a motor switching equipment are designated by the reference numerals 1, 2 and 3. Each of these conductors is surrounded by a U-shaped magnet yoke 4, 5 and 6 which is part of a fast-action electromagnetic tripping device. The corresponding armature and the further tripping parts have been omitted for simplification. Their design is generally known from numerous examples so that a detailed explanation can be dispensed with. Merely as an example, reference is made to DE-B-28 10 987, in which a fast-acting electromagnetic tripping device for a circuit breaker of compact design (MCCB) is described.

Essential for fast-action electromagnetic tripping devices of the above-mentioned type, which are used for the purposes of the invention, is the use of the continuous phase conductors 1, 2 and 3 as the sole exciter winding of each of the magnet yokes, 4, 5 and 6. In the normal design, the magnet yokes themselves are therefore free of any windings.

For the purposes of the invention, a single turn or a few turns 7, 8 or 9, respectively, are now arranged on each of the magnet yokes 4, 5 and 6. The space required by these windings is so small that the magnet yokes need not be enlarged over the customary design. Thereby, each of the magnet yokes is used as the iron core of a transformer, the primary winding of which is the corresponding conductor 1, 2 and 3. This arrangement is continuously operative and is independent of the absolute magnitude of the current and, in particular, independent of a current magnitude as required for pulling up the corresponding armature (not shown in the figure, however).

The three secondary windings 7, 8 and 9 are connected in series with each other, as well as with an electromechanical converter 10. Current flows through the electromechanical converter 10 only if the loading is uneven and, therefore, a difference current occurs, in contrast to the undisturbed state. This current flows through the electromechanical converter 10 which can contain, for instance, a bimetallic member. According to the characteristic of this bimetallic member, a displacement of a plunger 11 occurs after a certain amount of time which can be utilized either for activating a switch contact or a mechanical tripping element 12.

In dependence on the magnitude of the nominal current of the switch gear, it may be advantageous to provide several turns instead of a single turn 7, 8 and 9.

As can be seen from viewing the figure, the described tripping device with leading action can be accommodated in a switch gear independently of the conductor bars 1, 2 and 3 because first, an electrical auxiliary quantity is obtained. This device is therefore suitable as an additional building block for a switch gear which has a conventional current overload tripping device and should be given a leading characteristic for purposes of motor protection.

This leads to another advantageous embodiment which is drawn in the figure with dashed-dotted lines. The switch 14, which can be used optionally instead of a jumper 13, permits the opening of the secondary circuit. In this manner, a switch gear can be operated with or without a leading tripping action in case of asymmetry.

What is claimed is

1. In a current overload tripping device having a time-delayed leading tripping action during uneven loading of the phases of a multiphase circuit, said tripping device including a transformer current pickup for each phase of the multiphase circuit, which current pickup members are connected in series with each other and with an electromechanical converter, an improvement wherein each of the current pickup members comprises a winding surrounding a magnet yoke of an electromagnetic tripping device of each phase and said electromechanical converter comprises a temperature/time-dependent device operating to provide a time-delayed tripping signal.

2. The current overload tripping device of claim 1, wherein: the temperature/time-dependent device includes a heatable part of a shape-memory alloy.

3. The current overload tripping device of claim 1 and further a switch connected in series with the current pickup members and the electromechanical converter.

* * * * *